United States Patent [19]

Ikeda

[11] Patent Number: 5,678,761

[45] Date of Patent: Oct. 21, 1997

[54] AIR CONDITIONER FOR VEHICLES

[75] Inventor: Susumu Ikeda, Isesaki, Japan

[73] Assignee: Sanden Corporation, Gunma, Japan

[21] Appl. No.: 473,958

[22] Filed: Jun. 7, 1995

[30] Foreign Application Priority Data

Jul. 6, 1994 [JP] Japan .................................. 6-155039

[51] Int. Cl.$^6$ ...................................................... G05D 23/00
[52] U.S. Cl. ................ 237/2 B; 237/12.3 A; 237/12.3 B
[58] Field of Search ............................. 237/2 B, 12.3 A, 237/12.3 B

[56] References Cited

U.S. PATENT DOCUMENTS

| | | |
|---|---|---|
| 2,779,162 | 1/1957 | Baker et al. . |
| 2,958,209 | 11/1960 | Egon . |
| 3,006,163 | 10/1961 | Kooiker . |
| 3,006,164 | 10/1961 | McMillan . |
| 3,074,249 | 1/1963 | Henderson . |
| 3,564,865 | 2/1971 | Spencer et al. . |
| 4,262,492 | 4/1981 | Morita et al. . |
| 4,943,003 | 7/1990 | Shimizu et al. . |

*Primary Examiner*—Henry A. Bennett
*Assistant Examiner*—Derek S. Boles
*Attorney, Agent, or Firm*—Baker & Botts, L.L.P.

[57] ABSTRACT

An air conditioner for vehicles includes a combustion heater and a heat pump. The air conditioner comprises a heat medium heater-heating operation starting system, and a heating-condition switching system. The heat medium is subjected to heat exchange with air to be air-conditioned and is shared by the heat pump and the combustion heater. The heater-heating operation starting system starts the operation of the heat pump and the combustion heater when a heater switch is turned ON and an outside air temperature is less than or equal to a first predetermined temperature. The heating-condition switching system stops the operations of the heat pump and continues the operation of the combustion heater when the temperature of the heat medium is greater than or equal to a second predetermined temperature after the start of a heater-heating operation due to the heat pump and said combustion heater. The heating operation by the heat pump and the heater-heating operation using the combustion heater are performed distinctly from each other in accordance with environmental conditions and the like. The temperature of the heat medium increases rapidly, and the air temperature rises quickly.

2 Claims, 9 Drawing Sheets

AIR CONDITIONER FOR VEHICLES

BACKGROUND OF THE INVENTION

1. Field of the Invention

The present invention relates to an air conditioner for a compartment of vehicles for heating and the like of using a heat pump, and in particular, to an air conditioner mounted on an electric automobile and the like.

2. Description of the Related Art

Because electric automobile and the like which do not include an internal combustion engine, such as a gasoline engine and the like, cannot use the hot water and the like of a radiator as a heat source for heating, the air in a compartment is heated by a heat pump type refrigerant circuit provided with a motor-driven compressor.

Consequently, in such a heat pump type refrigerant circuit, when a heating operation is performed in an environment with a low outside air temperature, the desired amount of heat may not be pumped due to the insufficient heat exchange effected by an external heat exchanger. Further, the desired heating operation may not be carried out because of the forcible stopping of a compressor caused by pressure protection resulting from a drop of pressure on a low pressure side of the circuit.

To solve such problems, an air conditioner has been proposed wherein a circuit is provided for circulating a heat medium, such as water or ethylene glycol water solution heated by a combustion heater, to a heat radiating internal heat exchanger, thereby carrying out a heater-heating operation independent of a heat pump.

In such an air conditioner, however, even if the switching between the heating operation due to the heat pump and the heater-heating operation due to the combustion heater is left to selection of a user, it may be difficult for the user to select one of the operations distinctly from the other. Further, when the operations are simply switched, the temperature of exhaust air is lowered or the distribution of the temperature of the exhaust air is disturbed, and consequently, user comfort may be reduced. Further, there may also be a problem that because the temperature of a heat medium is low at the start of operation and the temperature of the heat medium is more slowly increased as compared with the situation in which air is directly heated, heating may be insufficiently performed immediately after the start of the air conditioner, and cold air is blown into a compartment.

Further, there may also be a problem that because a dehumidification effect may not be obtained in the above-described heater-heating operation, when heating is started in a humid environment, the compartment windows, e.g., the windshield may fog up.

SUMMARY OF THE INVENTION

It is an object of the present invention to provide an air conditioner for vehicles which may properly determine and start a heating operation due to a heat pump and a heater-heating operation and further may quickly raise air temperature.

It is another object of the present invention to provide an air conditioner for vehicles which may accomplish a dehumidifying operation together with a heater-heating operation.

To accomplish the above objects, an air conditioner for vehicles according to the present invention may include a combustion heater as a heat source and is capable of performing a heating operation by a heat pump. The air conditioner comprises a heat medium for heat exchange with air to be air-conditioned, which is shared by the heat pump and the combustion heater. The air conditioner further includes heater-heating operation starting means for starting operations of the heat pump and the combustion heater when a heater switch is turned ON and an outside air temperature is less than or equal to a first predetermined temperature. Moreover, the air conditioner may include heating-condition switching means for stopping the operation of the heat pump and continuing the operation of the combustion heater when the temperature of the heat medium is greater than or equal to a second predetermined temperature after the start of a heater-heating operation, due to the operation of the heat pump and the combustion heater.

In particular, when the heater switch is turned ON and the outside air temperature is less than or equal to the first predetermined temperature, the operation of the heat pump and the operation of the combustion heater are started. Thereafter, when the temperature of the heat medium is greater than or equal to the second predetermined temperature, the operation of the heat pump is stopped and the operation of the combustion heater may be continued.

The air conditioner may further comprise heater-heating operation stopping means for stopping the operation of the combustion heater when the heater switch is turned OFF or the outside air temperature is greater than the first predetermined temperature during the heater-heating operation.

In such an air conditioner, because the heater-heating operation is started at the time of a specified condition, i.e., when the heater switch is turned ON and the outside air temperature is less than or equal to the first predetermined temperature, the heating operation by the heat pump and the heater-heating operation using the combustion heater may be accomplished distinctly from each other in accordance with environmental conditions and the like. As a result, comfortable heating may be accomplished, and the disadvantages caused by user selection of operating modes may be avoided. Further, when the heater-heating operation is performed, because the heat of the refrigerant from the heat pump may also be used as a heat source until the temperature of a heat medium reaches the second predetermined temperature, the temperature of the heat medium may be increased rapidly, whereby air temperature may also be quickly raised. Moreover, because heating is performed by stopping the heat pump and independently operating the combustion heater after the temperature of the heat medium, e.g., brine, reaches the second predetermined temperature, an energy saving step may be performed avoiding wasteful consumption of energy caused by the operation of the heat pump.

Further, the present invention provides an air conditioner for vehicles including a combustion heater as a heat source and capable of endothermic reaction at an internal heat exchanger provided in a refrigerant circuit. The air conditioner comprises heater-heating dry operation starting means for starting the endothermic reaction occurring at the internal heat exchanger in the refrigerant circuit when the temperature of air before being heated is greater than or equal to a third predetermined temperature and a dry switch is turned ON during operation of the combustion heater.

The air conditioner may further comprise heater-heating dry operation stopping means for stopping the endothermic reaction occurring at the internal heat exchanger in the refrigerant circuit and only continuing the operation of the combustion heater when the dry switch is turned OFF or the temperature of air before being heated is less than the third predetermined temperature during a heater-heating dry operation.

The above air conditioner may further comprise a variable displacement compressor provided in the refrigerant circuit and compressor control means for controlling the output of the compressor, so that the temperature of air having passed through the internal heat exchanger is controlled at a fourth predetermined temperature in a heater-heating dry operation.

In the air conditioner described above, because the heater-heating dry operation begins by starting the endothermic reaction due to the internal heat exchanger in the refrigerant circuit when the temperature of air before being heated is greater than or equal to the third predetermined temperature and the dry switch is turned ON during the heater-heating operation, dehumidification and heating may be accomplished in accordance with environmental conditions and the like. User comfort may be increased by preventing vehicle windows, e.g., the windshield, from fogging during the heater-heating operation. Moreover, because the cooling operation is controlled based on the temperature of air before being heated, an energy saving step may be accomplished avoiding wasteful dehumidifying operation.

Further, in such an air conditioner, when the heater-heating dry operation is performed, an energy saving step may be accomplished by avoiding wasteful energy consumption caused by operation of the refrigerant circuit with the quantity of endothermic heat transfer necessary to dehumidification, in such a manner that the output of the compressor is controlled, so that the temperature of air having passed through the internal heat exchanger in the refrigerant circuit is controlled at the fourth predetermined temperature. As a result, a great advantage may be obtained in electric automobiles which may prevent the reduction of automobile range.

Further objects, features, and advantages of the present invention will be understood from the detailed description of the preferred embodiment of the present invention with reference to the appropriate figures.

BRIEF DESCRIPTION OF THE DRAWINGS

A preferred exemplary embodiment of the invention will now be described with reference to the appropriate figures, which is given by way of example only, and is not intended to limit the present invention.

DETAILED DESCRIPTION OF THE PREFERRED EMBODIMENT

Figure 1:
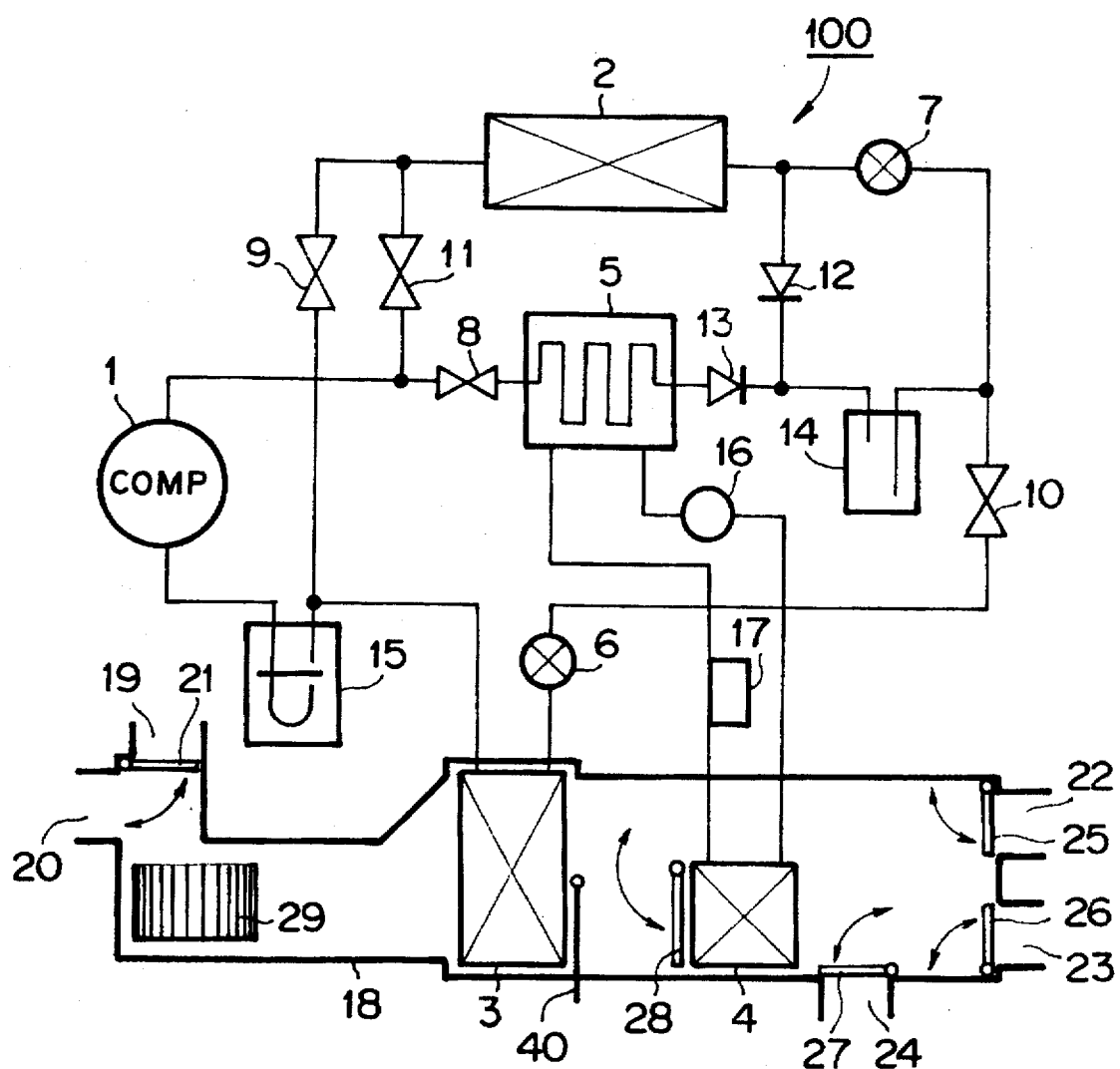
FIG. 1 is a schematic view of an air conditioner for vehicles according to an embodiment of the present invention.
Figure 2:
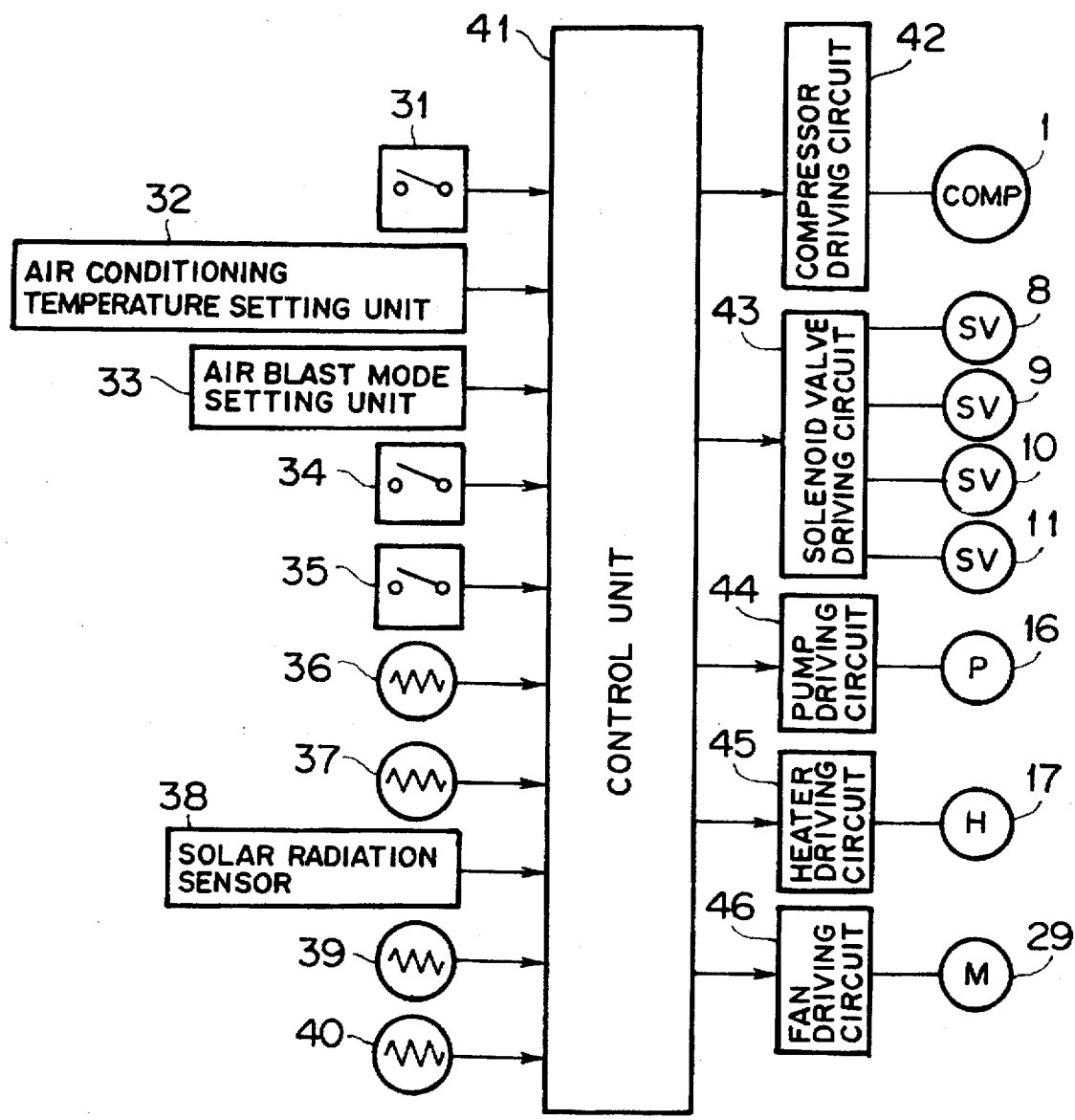
FIG. 2 is a block diagram showing a control circuit for the air conditioner shown in FIG. 1.

Referring to FIGS. 1 and 2, an air conditioner 100 for vehicles according to an embodiment of the present invention has a variable displacement motor-driven compressor 1, an external heat exchanger 2, a first internal heat exchanger 3, and a second internal heat exchanger 4 provided in a duct 18 through which the air for air conditioning is sent to a compartment (not shown). Further, air conditioner 100 includes a brine refrigerant heat exchanger 5, a brine circulating motor-driven pump 16, and a combustion heater 17 with a burner and a heat exchanger for heating brine.

Duct 18 has an outside-air intake port 19 and an inside-air intake port 20. The balance between outside air and inside air drawn into duct 18 is adjusted by a switching damper 21. A motor fan 29 is provided in duct 18 as air forcing means for sending air from the intake ports 19 and 20 to a compartment. In duct 18, first internal heat exchanger 3 and second internal heat exchanger 4 are arranged in this order in the flow direction of air in duct 18, and an air mixing damper 28 is provided immediately upstream of the second internal heat exchanger 4. Moreover, an air temperature sensor 40, such as a thermistor, is provided at a position downstream of first internal heat exchanger 3 as a sensor for detecting the temperature of the exhaust air from the first internal heat exchanger 3 (i.e., temperature of air before being heated "Te").

The exhaust ports of duct 18 comprise a vent exhaust port 22, a foot exhaust port 23, and a defroster exhaust port 24. A damper 25 opens and closes vent exhaust port 22, a damper 26 opens and closes foot exhaust port 23, and a damper 27 opens and closes defroster exhaust port 24.

The discharge port of compressor 1 is connected to a first port of external heat exchanger 2 via fourth solenoid valve 11, and the second port of the external heat exchanger 2 is connected to the inlet of receiver 14 via first check valve 12. The outlet of receiver 14 is connected to a first port of first internal heat exchanger 3 via third solenoid valve 10 and first expansion valve 6, and the second port of the first internal heat exchanger 3 is connected to the inlet of accumulator 15. The outlet of accumulator 15 is connected to the suction port of compressor 1.

The discharge port of compressor 1 is also connected to a first end port of the refrigerant path of brine refrigerant heat exchanger 5 through first solenoid valve 8, and the second end port of the refrigerant path of the brine refrigerant heat exchanger 5 is connected to the inlet of receiver 14 through second check valve 13. A first end port of the brine path of brine refrigerant heat exchanger 5 is connected to a first port of second internal heat exchanger 4 through a pipe provided with combustion heater 17, and the second port of the second internal heat exchanger 4 is connected to the second end port of the brine path of the brine refrigerant heat exchanger 5 through a path having motor-driven pump 16 installed therein.

Further, second expansion valve 7 is interposed between the outlet of receiver 14 and the second port of external heat exchanger 2, and second solenoid valve 9 is interposed between the first port of the external heat exchanger 2 and the inlet of accumulator 15.

FIG. 2 shows a control circuit for the above-described air conditioner. Referring to FIG. 2, an air conditioner switch 31, an air conditioning temperature setting unit 32, an air blast mode setting unit 33, a dry switch 34, a heater switch 35, an inside air temperature sensor 36 including a thermistor or the like, an outside air temperature sensor 37 including a thermistor or the like, a solar radiation sensor 38 including a photosensor or the like, a brine temperature sensor 39 including a thermistor or the like to detect the temperature of brine supplied to second internal heat exchanger 4, and an air temperature sensor 40 including a thermistor or the like to detect the temperature of air on the exhaust side of first internal heat exchanger 3, are connected. Referring to FIG. 1, the temperature of air on the exhaust side of first internal heat exchanger 3 is Te, the air temperature before heating. Control unit 41 is connected to a compressor driving circuit 42, a solenoid valve driving circuit 43, a pump driving circuit 44, a heater driving circuit 45, and a fan driving circuit 46, and supplies driving signals to these driving circuits.

Air conditioning temperature setting unit 32 includes a temperature setting lever or temperature setting buttons, and a desired air conditioning temperature may be selected and set by operating the setting lever or buttons. Air blast mode setting unit 33 includes a variable air volume lever for designating an "OFF" mode and an "AUTO" mode. The volume of air may be varied in a plurality of discrete steps or continuously by the variable lever. Moreover, the volume of air may be controlled by control unit 41 through switching to the "AUTO" mode.

Control unit 41 includes a CPU, ROM, RAM, and the like, and the ROM may store a mode determination and start program described in detail later. In addition to a compressor rotation control program, the ROM may also contain a valve switching control program and the like. Thus, control unit 41 supplies signals to respective driving circuits 42 to 46 based on the operational signals of air conditioner switch 31, air conditioning temperature setting unit 32, air blast mode setting unit 33, dry switch 34, and heater switch 35, and the signals detected by inside air temperature sensor 36, outside air temperature sensor 37, solar radiation sensor 38, brine temperature sensor 39, and air temperature before heating sensor 40.

Compressor driving circuit 42 controls the rotational speed of compressor 1 based on a rotational speed signal from control unit 41 and thereby varies the compressor output. Solenoid valve driving circuit 43 controls the opening and closing of respective solenoid valves 8 to 11 based on the mode signals from control unit 41 and thereby switches the refrigerant cycle. Pump driving circuit 44 controls the supply of electric power to motor-driven pump 16 based on the pump signal from control unit 41.

Heater driving circuit 45 controls the combustion within combustion heater 17 based on the heater signal from control unit 41 so as to set the temperature (Tw) of brine supplied to second internal heat exchanger 4 to a predetermined value. Fan driving circuit 46 controls electric power supplied to motor fan 29 based on an air volume signal from control unit 41 and varies the air blast capacity of motor fan 29.

In the above-described air conditioner, six operation modes of cooling, dry cooling, heating, dry heating, heater heating and dry heater heating dry may be performed based on the mode determination by control unit 41. Determination/start methods of the respective modes and the operations thereof will be explained further below.

Figure 3:
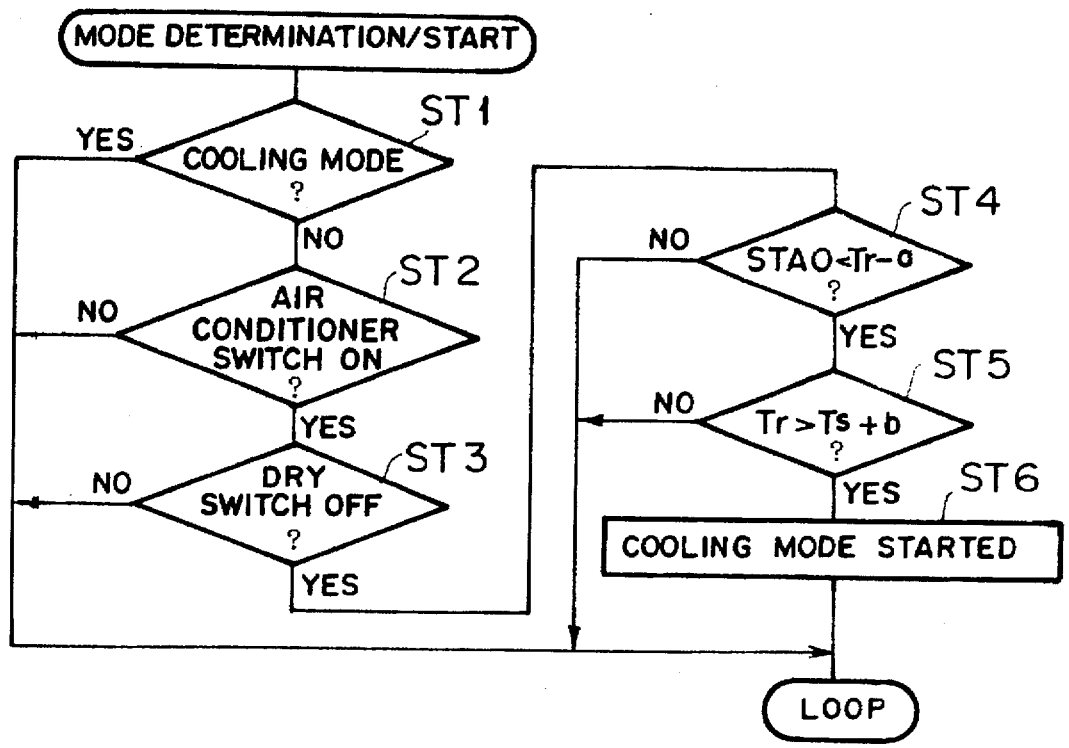
FIG. 3 is a flowchart showing a control for determining and starting a cooling mode in the air conditioner shown in FIG. 1.

FIG. 3 shows the determination/start sequence for a cooling mode. First, it is determined whether the cooling mode is selected (step ST1). When the cooling mode is not selected, it is determined whether air conditioner switch 31 is turned ON (step ST2). When air conditioner switch 31 is turned ON, it is determined whether dry switch 34 is turned OFF (step ST3). When it is determined that the cooling mode is selected, air conditioner switch 31 is not turned ON, and dry switch 34 is not turned OFF, the flow proceeds to loop. However, when it is determined that the cooling mode is not selected, air conditioner switch 31 is turned ON and dry switch 34 is turned OFF, the following relationships are monitored (steps ST4 and ST5):

$$STAO < Tr-a;\ \text{and}$$

$$Tr > Ts+b.$$

In the above relationships, "STAO" represents a start determination exhaust temperature, "Tr" represents an inside air temperature, "Ts" represents a set temperature, and "a" and "b" represent temperature correction values. The start determination exhaust temperature STAO is calculated by the control unit 41 as needed based on the following equation:

$$STAO = Ks \cdot Ts - Kr \cdot Ts - Kam \cdot Tam - Krad \cdot Trad + C.$$

In this equation, Ts is a set temperature, Tam is an outside air temperature, Trad is a numerical value obtained by converting a given amount of solar radiation into temperature, Ks is a set temperature correction factor, Kr is an inside air temperature correction factor, Kam is an outside air temperature correction factor, Krad is a solar radiation correction factor, and C is a temperature correction value.

When the start determination exhaust temperature STAO is less than Tr−a and the inside air temperature "Tr" is greater than Ts+b, the mode is a cooling mode, and the operation of the cooling mode begins (step ST6).

Figure 4:
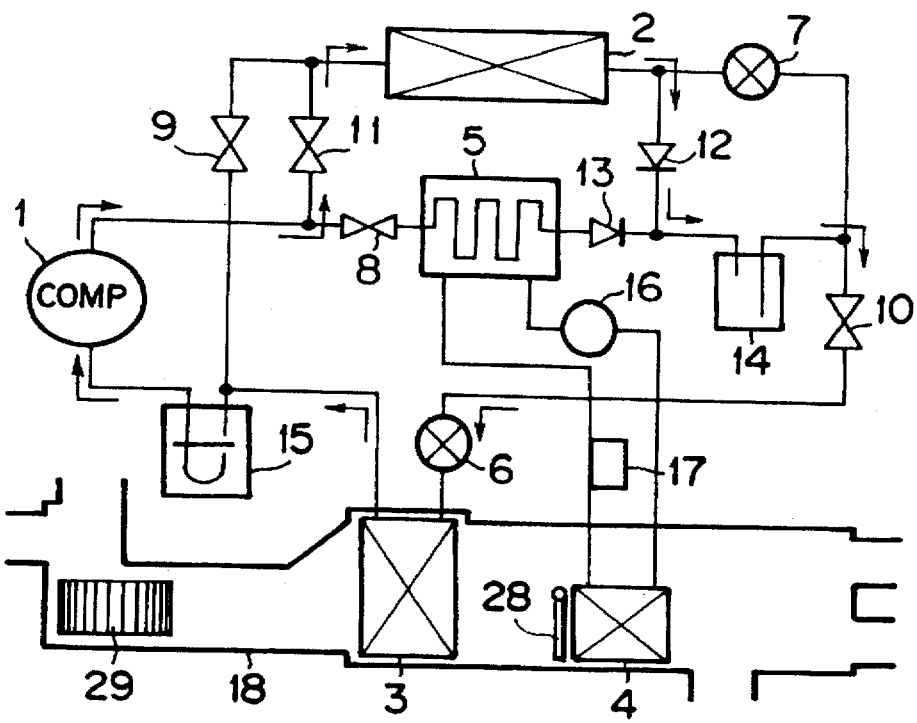
FIG. 4 is a schematic view of the air conditioner shown in FIG. 1, showing an operation condition of the cooling mode.

As shown in FIG. 4, the operation in this cooling mode is performed in such a manner that first and second solenoid valves 8 and 9 are closed, third and fourth solenoid valves 10 and 11 are opened, and compressor 1 and motor fan 29 are activated. Refrigerant discharged from compressor 1 is sent to external heat exchanger 2 through solenoid fourth valve 11 and condensed therein. The condensed refrigerant is sent to first expansion valve 6 and first internal heat exchanger 3 through first check valve 12, receiver 14 and third solenoid valve 10 and evaporated in heat exchanger 3. The evaporated refrigerant is sucked into compressor 1 through the accumulator 15.

Specifically, in this cooling mode, a compartment may be cooled by utilizing the endothermic reaction occurring in first internal heat exchanger 3.

Figure 5:
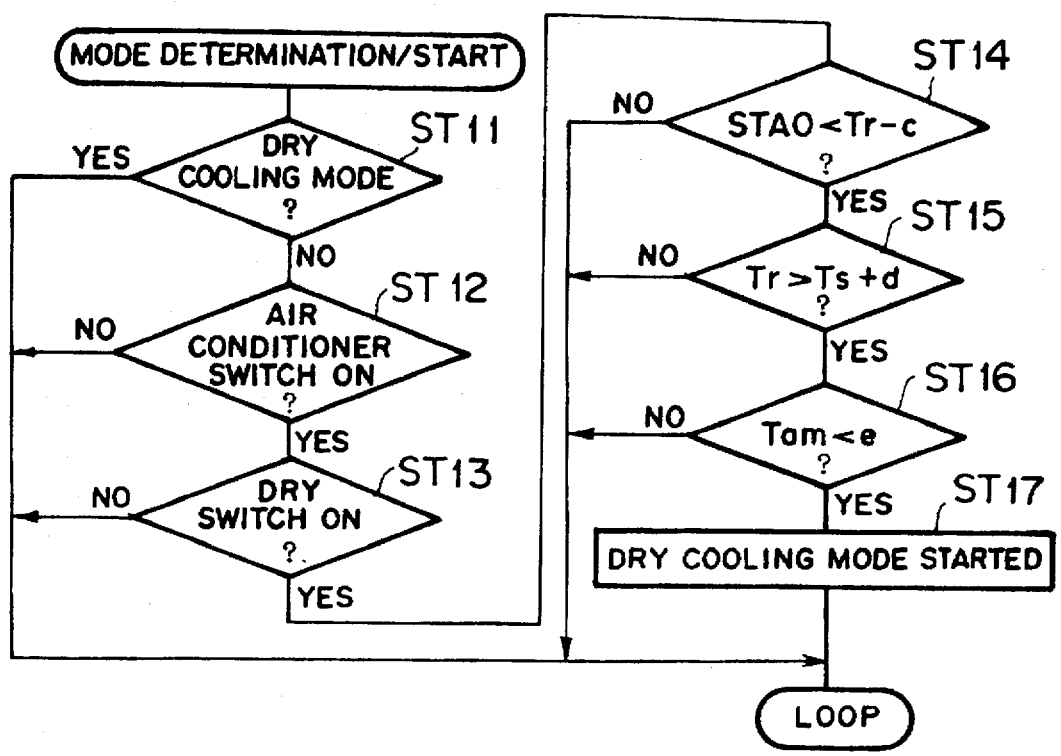
FIG. 5 is a flowchart showing a control for determining and starting a dry cooling mode in the air conditioner shown in FIG. 1.

FIG. 5 shows the determination/start sequence for a dry cooling mode. First, it is determined whether the dry cooling mode is selected (step ST11). When the dry cooling mode is not selected, it is determined whether air conditioner switch 31 is turned ON (step ST12). When air conditioner switch 31 is turned ON, it is determined whether dry switch 34 is turned ON (step ST13). When it is determined that the dry cooling mode is selected, air conditioner switch 31 is not turned ON and dry switch 34 is not turned ON, the flow proceeds to loop. However, when it is determined that the dry cooling mode is not selected, air conditioner switch 31 is turned ON and dry switch 34 is turned ON, the following relationships are monitored (steps ST14 to ST16):

$STAO < Tr - c;$ $Tr > Ts + d;$ and $Tam < e.$

In the above relationships, "c" and "d" represent temperature correction values and "e" represents a temperature constant, for example, 20° C.

When the start determination exhaust temperature STAO is lower than (an inside air temperature Tr−c), the inside air temperature "Tr" is higher than (a set temperature Ts+d) and the outside air temperature "Tam" is lower than "e", it is determined that the mode is a dry cooling mode, and the operation of the dry cooling mode is started (step ST17).

Figure 6:
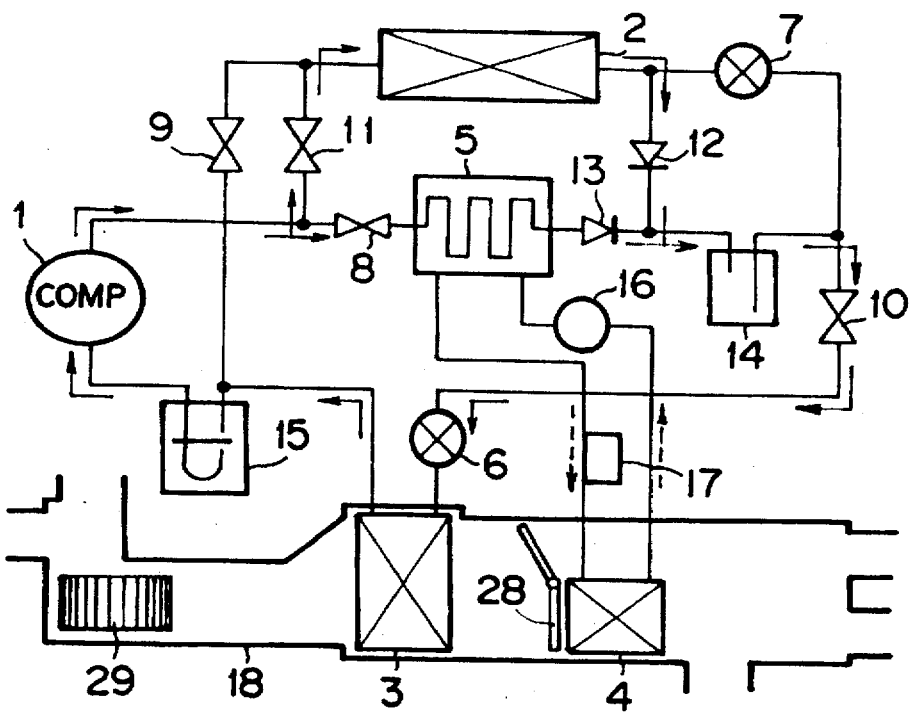
FIG. 6 is a schematic view of the air conditioner shown in FIG. 1, showing an operating condition of the dry cooling mode.

As shown in FIG. 6, the operation of this dry cooling mode is performed in such a manner that first, third, and fourth solenoid valves 8, 10 and 11 are opened; second solenoid valve 9 is closed; and compressor 1, motor-driven pump 16, and motor fan 29 are activated. A part of refrigerant discharged from compressor 1 is sent to external heat exchanger 2 through fourth solenoid valve 11 and condensed therein. The condensed refrigerant then is sent to first expansion valve 6 and first internal heat exchanger 3 through first check valve 12, receiver 14, and third solenoid valve 10 and evaporated in heat exchanger 3. The evaporated refrigerant then is drawn into compressor 1 through accumulator 15. The remaining part of refrigerant discharged from compressor 1 is sent to brine refrigerant heat exchanger 5 through first solenoid valve 8 and condensed in heat exchanger 5 by the heat exchange with brine. The condensed refrigerant from heat exchanger 5 joins the refrigerant from heat exchanger 3 after having passed through second check valve 13. The brine heated by brine refrigerant heat exchanger 5 is then circulated between the brine refrigerant heat exchanger 5 and second internal heat exchanger 4.

Specifically, in this dry cooling operation mode, because first internal heat exchanger 3 and second internal heat exchanger 4 display an endothermic reaction and a heat radiating transfer, respectively, the air in the compartment also may be dehumidified by utilizing both actions without lowering the temperature of exhaust air. The temperature and the amount of dehumidification at that time may be controlled by adjusting the output of compressor 1 and the degree of opening of air mixing damper 28. Further, the ratio of the flow rate in the refrigerant flow path to the brine refrigerant heat exchanger 5 to the flow rate in the refrigerant flow path to the external heat exchanger 2 varies in accordance with change in opening degree of air mixing damper 28 (that is, the volume of air passing through the second internal heat exchanger 4). As a result, a balance between the endothermic reaction in the first internal heat exchanger 3 and the heat radiating transfer in the external heat exchanger 2 and the brine refrigerant heat exchanger 5 is properly maintained. Specifically, when the opening degree of air mixing damper 28 approaches zero, that is, when the volume of air passing through the second internal heat exchanger 4 approaches zero, a percentage of the flow rate to the external heat exchanger 2 approaches to a maximum value, so that the heat radiating transfer in the external heat exchanger 2 shifts to a greater amount side.

Figure 7:
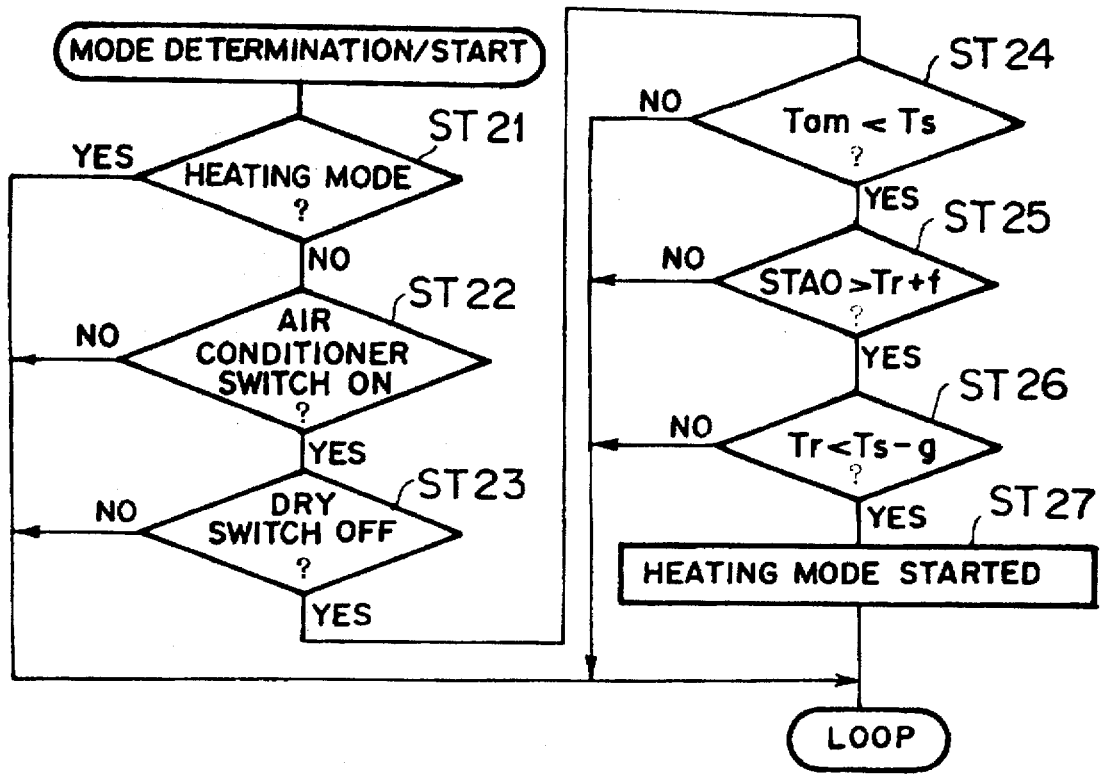
FIG. 7 is a flowchart showing a control for determining and starting a heating mode in the air conditioner shown in FIG. 1.

FIG. 7 shows the determination/start sequence for a heating mode. First, it is determined whether the heating mode is selected (step ST21). When the heating mode is not selected, it is determined whether air conditioner switch 31 is turned ON (step ST22). When air conditioner switch 31 is turned ON, it is determined whether dry switch 34 is turned OFF (step ST23). When it is determined that the heating mode is selected, air conditioner switch 31 is not turned ON, and dry switch 34 is not turned OFF, the flow proceeds to loop. However, when it is determined that the heating mode is not selected, air conditioner switch 31 is turned ON and dry switch 34 is turned OFF, the following relationships are monitored (steps ST24 to ST26):

$Tam < Ts;$ $STAO > Tr + f;$ and $Tr < Ts - g.$

In the above relationships, "f" and "g" represent temperature correction values.

When the outside air temperature "Tam" is less than the set temperature "Ts", the start determination exhaust temperature STAO is greater than Tr+f, and the inside air temperature "Tr" is less than Ts−g, the mode is a heating mode, and the operation of the heating mode begins (step ST27).

Figure 8:
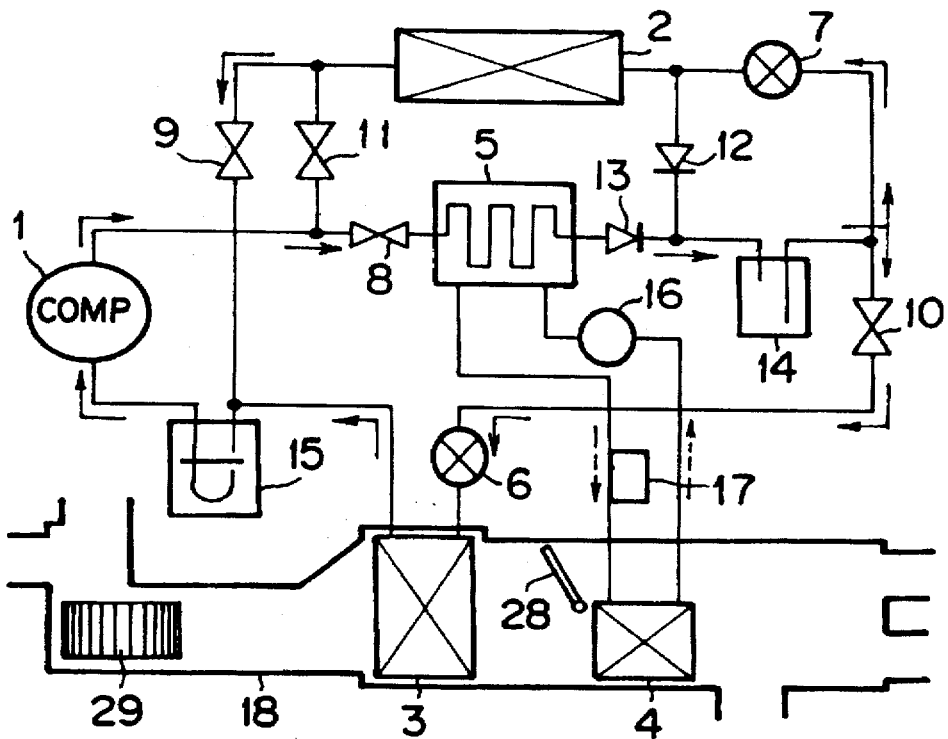
FIG. 8 is a schematic view of the air conditioner shown in FIG. 1, showing an operating condition of the heating mode.

As shown in FIG. 8, the operation of this heating mode is performed in such a manner that first, second, and third solenoid valves 8, 9 and 10 are opened; fourth solenoid valve 11 is closed; and compressor 1, motor-driven pump 16, and motor fan 29 are activated. Refrigerant discharged from compressor 1 is sent to brine refrigerant heat exchanger 5 through first solenoid valve 8 and condensed therein by heat exchanged with brine. The refrigerant diverges into two streams after having passed through second check valve 13 and receiver 14. The first stream is sent to first expansion valve 6 and first internal heat exchanger 3 through third solenoid valve 10 and evaporated in heat exchanger 3, and drawn into compressor 1 through accumulator 15. The brine heated in brine refrigerant heat exchanger 5 is then circulated between the brine refrigerant heat exchanger 5 and second internal heat exchanger 4. Further, the second stream is sent to second expansion valve 7 and external heat exchanger 2 and evaporated in heat exchanger 2. The second stream joins the first stream at the inlet port of accumulator 15 after having passed through second solenoid valve 9.

Specifically, in the mode of operation described above, the air in the compartment may be heated by utilizing the heat radiating transfer occurring in second internal heat exchanger 4. In addition, the air in the compartment may be dehumidified by utilizing the endothermic reaction occurring in first internal heat exchanger 3 by causing external heat exchanger 2 and the first internal heat exchanger 3 to effect the endothermic reaction. The heating capacity and the amount of dehumidification at that time may be controlled by adjusting the output of compressor 1 and the degree of opening of air mixing damper 28.

Figure 9:
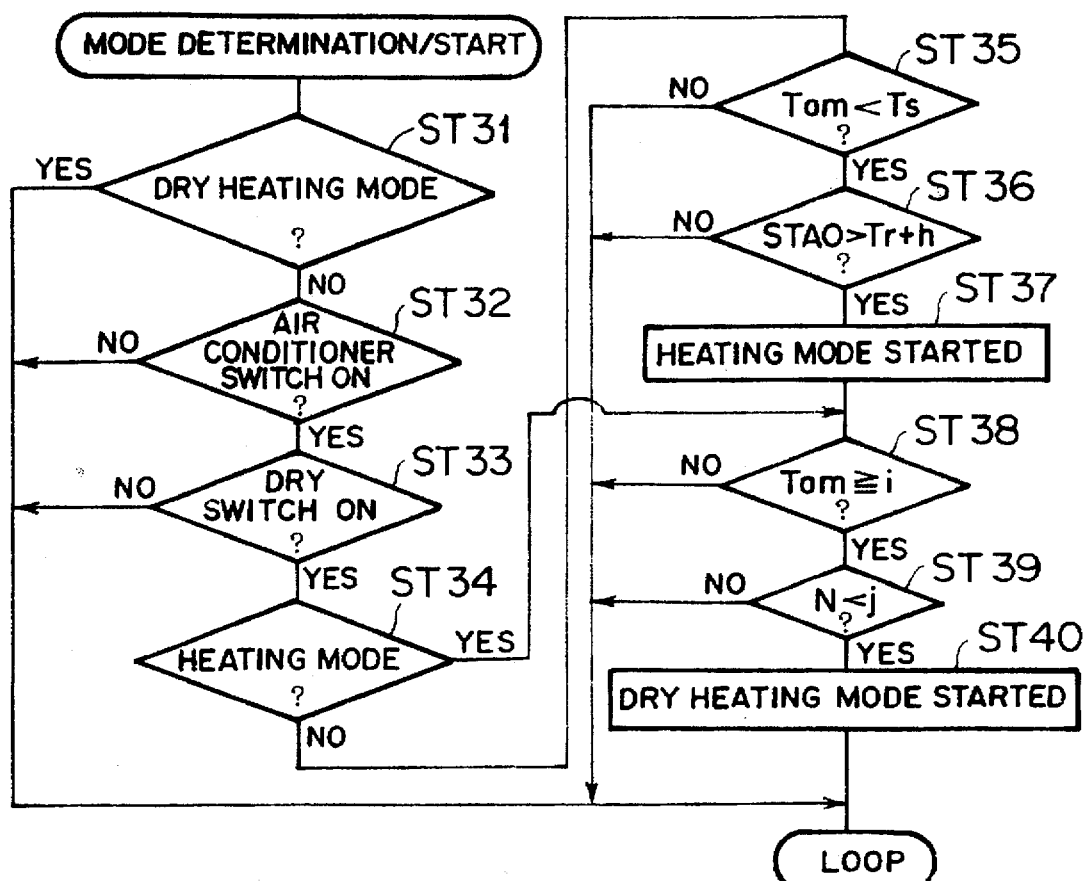
FIG. 9 is a flowchart showing a control for determining and starting a dry heating mode in the air conditioner shown in FIG. 1.

FIG. 9 shows the determination/start sequence for a dry heating mode. First, it is determined whether the dry heating mode is selected (step ST31). When the dry heating mode is not selected, it is determined whether air conditioner switch 31 is turned ON (step ST32). When air conditioner switch 31 is turned ON, it is determined whether dry switch 34 is turned ON (step ST33). When it is determined that the dry heating mode is selected, air conditioner switch 31 is not turned ON, and dry switch 34 is not turned ON, the flow proceeds to loop. However, when it is determined that the dry heating mode is not selected, air conditioner switch 31 is turned ON and dry switch 34 is turned ON, it is determined whether the present operation mode is heating mode (step ST 34). When it is determined that the present operation mode is not heating mode, the following relationships are monitored (steps ST35 and ST36):

$Tam < Ts$; and $STAO > Tr + h.$

In the above relationships, "h" represents a temperature correction value.

First, when the outside air temperature "Tam" is less than the set temperature "Ts" and the start determination exhaust temperature STAO is greater than Tr+h, the heating operation mode begins (step ST37). When it is determined that the present operation mode is heating mode at step 34 or after the heating operation mode is started at step ST37, the following relationships are monitored (steps ST38 and step ST39):

$Tam \geq i$; and $N < j.$

In the above relationships, "i" represents a temperature constant, for example, 5° C., "N" represents the rotational speed of compressor 1, and "j" represents the criterion for determination of rotational speed.

In the operation of the heating mode, when the outside air temperature "Tam" is greater than or equal to "i" and the rotational speed of the compressor "N" is less than "j", it is determined that the mode is a dry heating mode, and the operation of the dry heating mode begins (step ST40).

Figure 10:
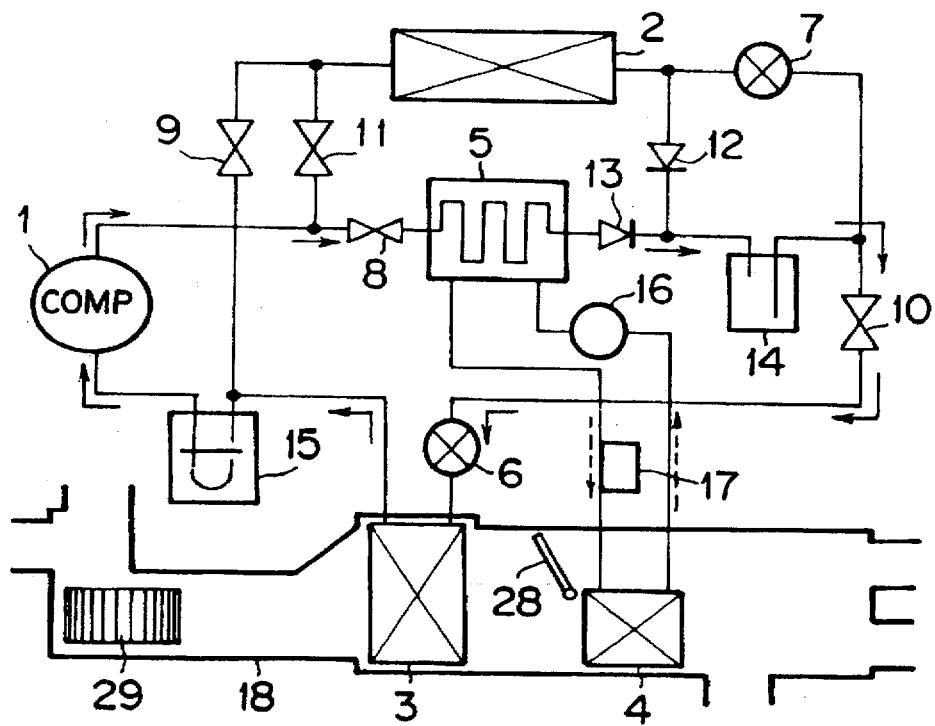
FIG. 10 is a schematic view of the air conditioner shown in FIG. 1, showing an operating condition of the dry heating mode.

As shown in FIG. 10, the operation of this dry heating mode is performed in such a manner that first and third solenoid valves 8 and 10 are opened; second and fourth solenoid valves 9 and 11 are closed; and compressor 1, motor-driven pump 16, and motor fan 29 are activated. Refrigerant discharged from compressor 1 is sent to brine refrigerant heat exchanger 5 through first solenoid valve 8 and condensed in heat exchanger 5 by heat exchanged with brine. The condensed refrigerant is sent to first expansion valve 6 and first internal heat exchanger 3 through third solenoid valve 10 after having passed through second check valve 13 and receiver 14 and evaporated in heat exchanger 3, and it is drawn into compressor 1 through accumulator 15. The brine heated in brine refrigerant heat exchanger 5 is then circulated between the brine refrigerant heat exchanger 5 and second internal heat exchanger 4.

Specifically, in the above operation mode, the air in the compartment may be heated by utilizing the heat radiating transfer occurring in second internal heat exchanger 4, and at the same time the air in the compartment may be dehumidified by utilizing the endothermic reaction occurring in first internal heat exchanger 3. The heating capacity and the amount of dehumidification at that time may be controlled by adjusting the output of compressor 1 and the degree of opening of air mixing damper 28.

Figure 11:
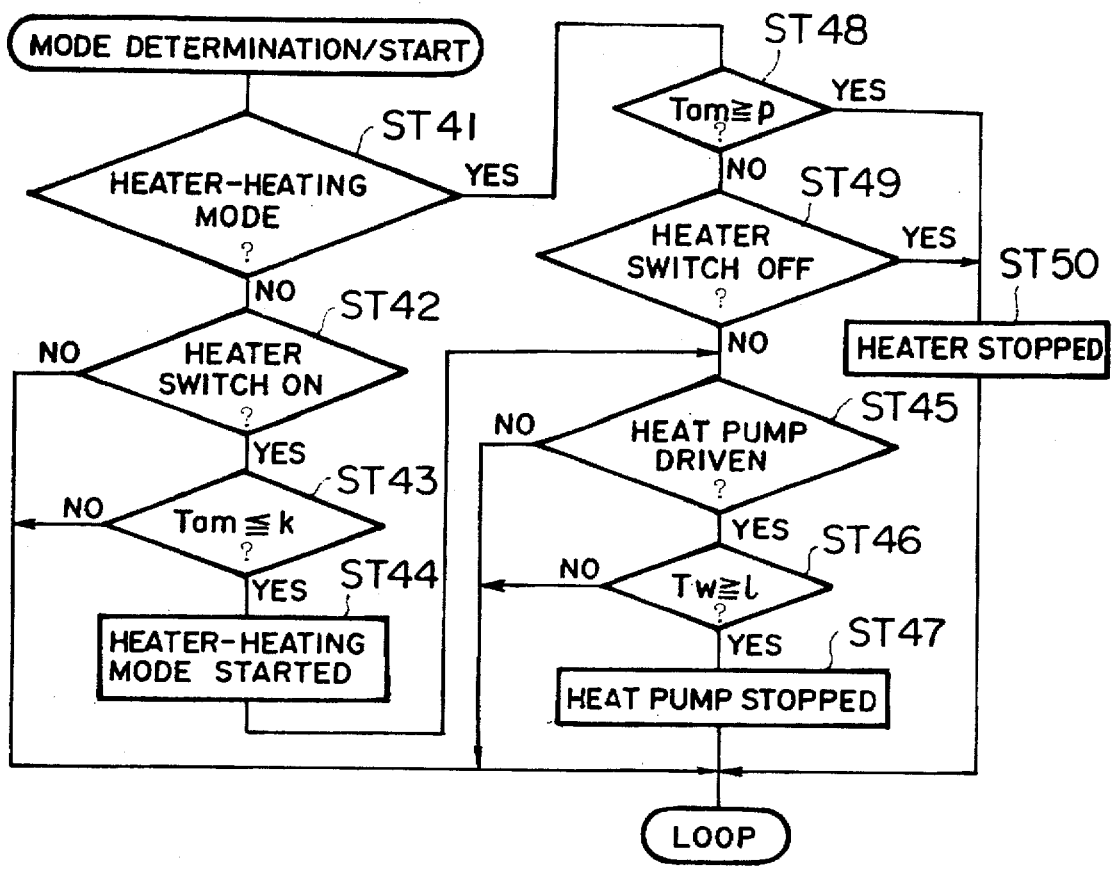
FIG. 11 is a flowchart showing a control for determining and starting a heater-heating mode in the air conditioner shown in FIG. 1.

FIG. 11 shows the determination/start sequence for a heater-heating mode. First, it is determined whether the present operational mode is heater-heating mode (step ST41). When the present mode is not heater-heating mode, it is determined whether heater switch 35 is turned ON (step ST42). When heater switch 35 is turned ON, the following relationship is monitored (step ST43):

$Tam \leq k.$

In the above relationship, "k" represents a temperature constant, for example, 0° C.

When the outside air temperature "Tam" is less than or equal to "k", it is determined that the mode is a heater-heating mode, and the operation of the heater-heating mode begins (step ST44). When it is determined that heater switch 35 is not turned ON at step ST42 or the relationship ($Tam \leq k$) is not satisfied at step ST 43, the flow proceeds to loop.

Figure 12:
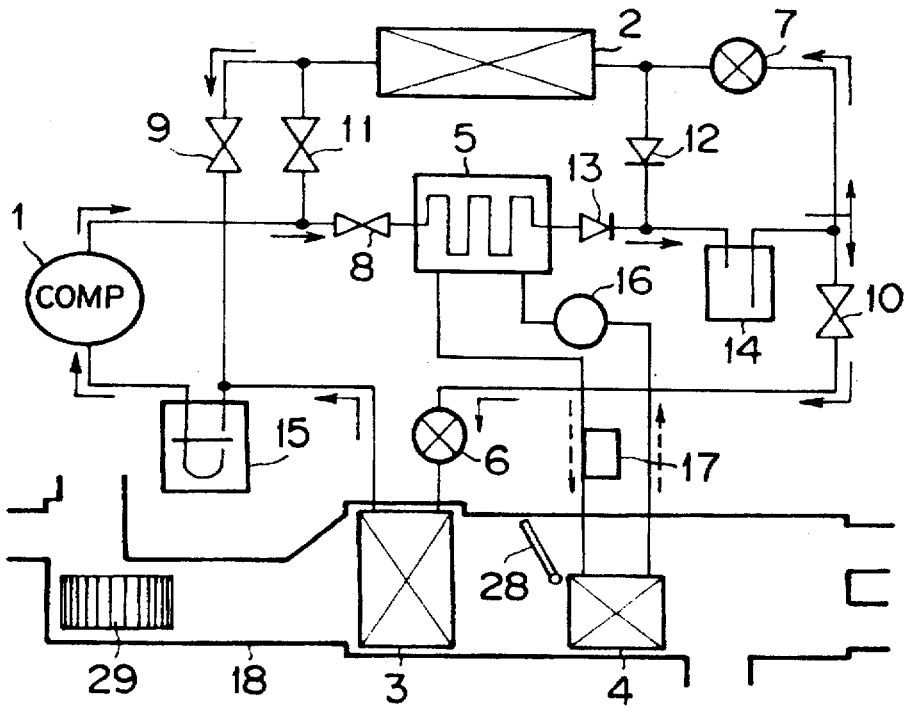
FIG. 12 is a schematic view of the air conditioner shown in FIG. 1, showing an operating condition of the heater-heating mode.

As shown in FIG. 12, the operation of this heater-heating mode by heater is performed in such a manner that first, second, and third solenoid valves 8, 9 and 10 are opened; fourth solenoid valve 11 is closed; and compressor 1, motor-driven pump 16, combustion heater 17, and motor fan 29 are activated. Refrigerant discharged from compressor 1 is sent to brine refrigerant heat exchanger 5 through first solenoid valve 8 and condensed in heat exchanger 5 by heat exchanged with brine. The refrigerant diverges into two streams after having passed through second check valve 13 and receiver 14. The first stream is sent to first expansion valve 6 and first internal heat exchanger 3 through third solenoid valve 10, and evaporated in heat exchanger 3, and then drawn into compressor 1 through accumulator 15. The brine heated in brine refrigerant heat exchanger 5 is further heated by combustion heater 17, and is then circulated between the brine coolant heat exchanger 5 and second internal heat exchanger 4. Further, the second stream is sent to second expansion valve 7 and external heat exchanger 2 and evaporated in heat exchanger 2. The second stream then joins the first stream at the inlet port of accumulator 15 after having passed through second solenoid valve 9.

After the operation is started in the above mode, it is determined whether the heat pump has been activated (step ST45). When the heat pump has been activated, the following relationship is monitored (step ST46):

$Tw \geq 1.$

In the relationship, "Tw" represents a brine temperature and "1" represents a temperature constant, for example, 60° C.

When the brine temperature "Tw" is greater than or equal to "1" after the operation starts, the operation of compressor 1 (operation of the heat pump) is stopped, and the brine which is only heated by combustion heater 17 is circulated to perform heating thereafter (step ST47). When it is determined that the heat pump has not been activated at step ST45, or the relationship ($Tw \geq 1$) is not satisfied, the flow proceeds to loop.

After the independent operation of the heater, the following relationships are monitored (steps ST48 and ST49):

$Tam \geq p$; and heater switch 35:turned OFF.

In the above relationships, "p" represents a temperature constant, for example, 4.4° C., higher than the aforementioned "k".

Either when the outside air temperature "Tam" is greater than or equal to "p" or when heater switch 35 is turned OFF while combustion heater 17 is independently operated, the operation of the combustion heater 17 is stopped (step ST50). When the aforementioned start conditions for the heating mode are satisfied when combustion heater 17 is stopped, operation in the heating mode continues.

Specifically, in the operation mode described above, the air in the compartment may be heated by utilizing the heat radiating transfer occurring in second internal heat exchanger 4. In addition, the heating capacity at that time may be controlled by adjusting the degree of opening of air mixing damper 28.

Figure 13:
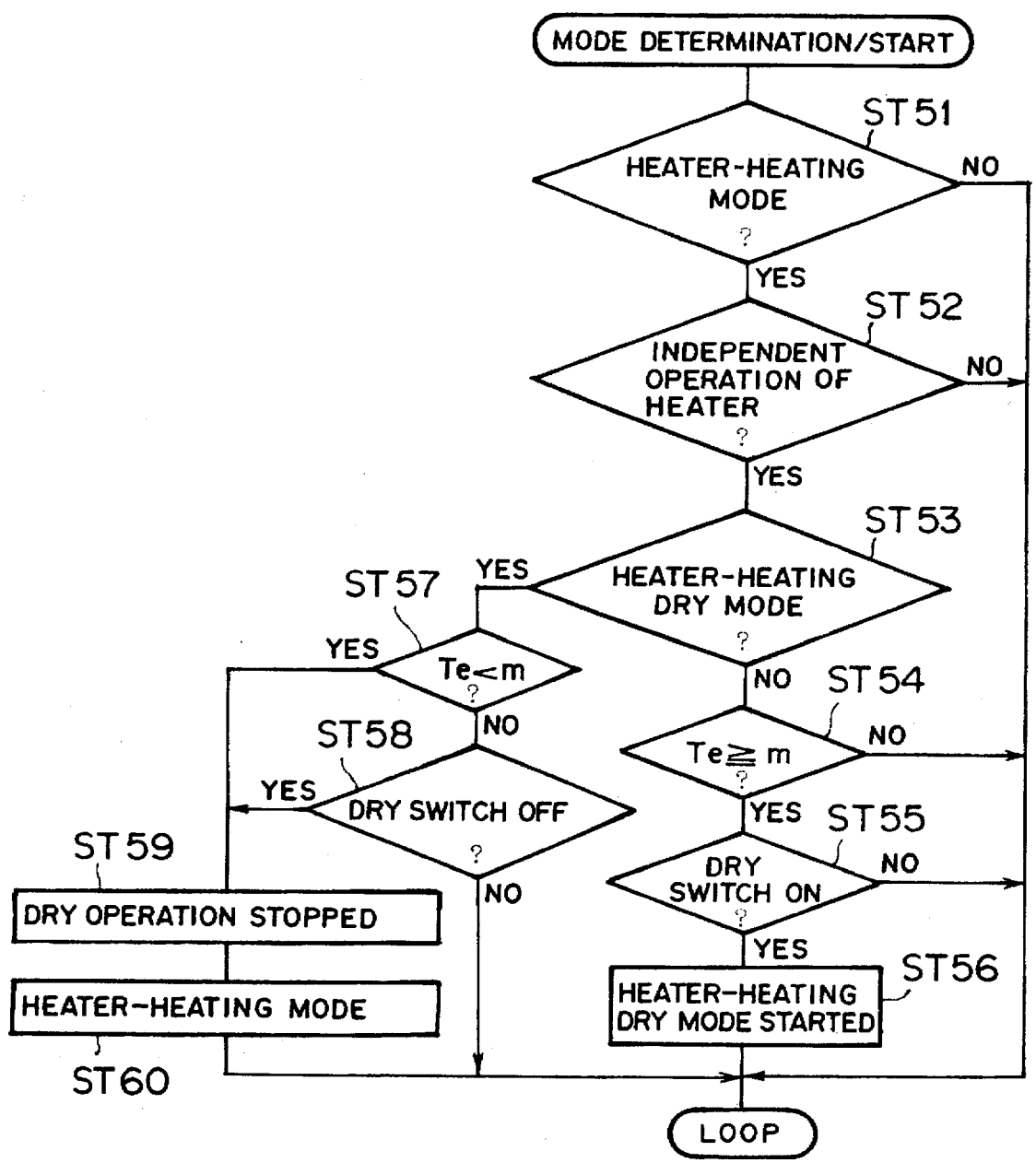
FIG. 13 is a flowchart showing a control for determining and starting a heater-heating dry mode in the air conditioner shown in FIG. 1.

FIG. 13 shows the determination/start sequence for a heater-heating dry mode. This operation mode is started only when the heater is independently operated in the above heater-heating mode. First, it is determined whether the present operational mode is heater-heating mode (step ST51). When the present mode is heater-heating mode, it is also determined whether the heater is independently operated (step ST52). When the heater is independently operated, it is further determined whether the present mode is heater-heating dry mode (step ST53). However, when the heater is independently operated and the present mode is not heater-heating dry mode, the following relationships are monitored (steps ST54 and ST55):

$Te \geq m$; and dry switch 34:turned ON.

In the above relationships, "Te" represents the temperature of air before being heated and "m" represents a temperature constant, for example, 3°.

When the temperature of air before being heated "Te" is greater than or equal to "m" and dry switch 34 is turned ON while the heater is independently operated, the mode is a heater-heating dry mode, and the operation of the heater-heating dry mode begins (step ST56). However, when the present mode is not heater-heating mode at step ST51, the heater is not independently operated at step ST52, the relationship ($Te \geq m$) is not satisfied at step ST54 or dry switch 34 is not turned ON at step ST55, the flow proceeds to loop.

Figure 14:
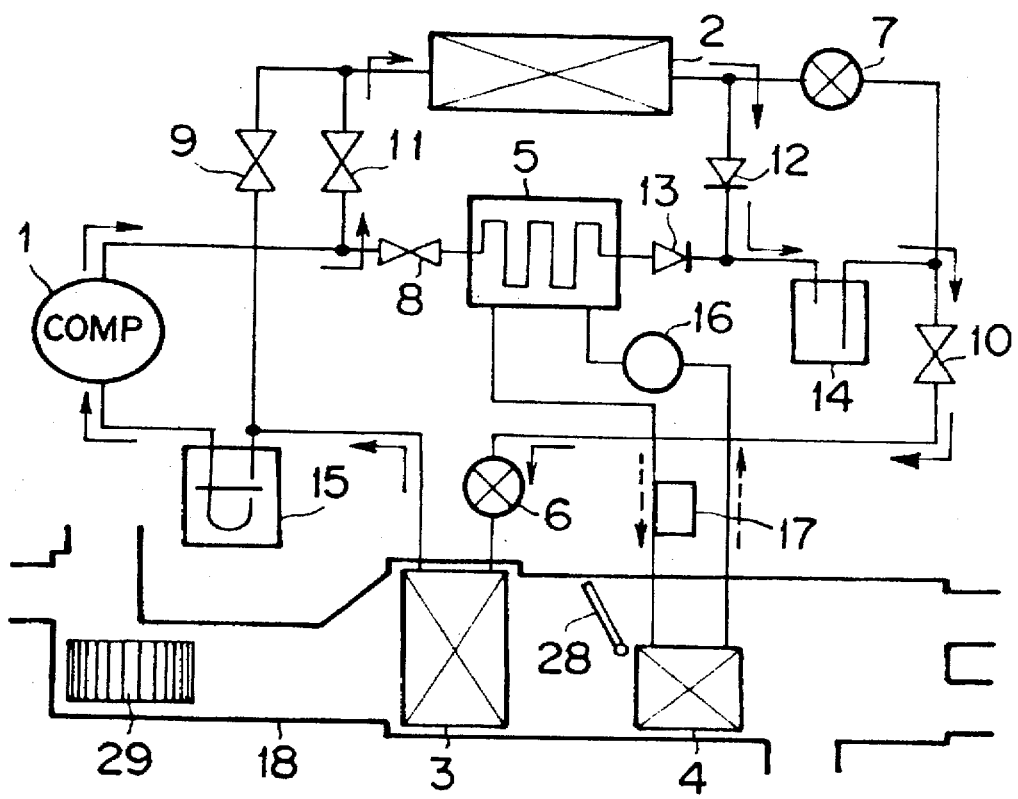
FIG. 14 is a schematic view of the air conditioner shown in FIG. 1, showing an operating condition of the heater-heating dry mode.

As shown in FIG. 14, the operation of this heater-heating dry mode is performed in such a manner that third and fourth solenoid valves 10 and 11 are opened; first and second solenoid valves 8 and 9 are closed; and compressor 1, motor-driven pump 16, combustion heater 17, and motor fan 29 are activated. Refrigerant discharged from compressor 1 is sent to external heat exchanger 2 through fourth solenoid valve 11 and condensed in external heat exchanger 2. The condensed refrigerant then is sent to first expansion valve 6 and first internal heat exchanger 3 through first check valve 12, receiver 14, and third solenoid valve 10 and evaporated in heat exchanger 3. The evaporated refrigerant then is drawn into compressor 1 through accumulator 15. The brine heated by brine refrigerant heat exchanger 5 is circulated between the brine refrigerant heat exchanger 5 and second internal heat exchanger 4 independently from the above-described refrigerant cycle.

Thus, the operation of this heater-heating dry mode is performed in such a manner that the refrigerant circuit side is operated in the cooling mode while the heater is independently operated. Specifically, in the operation mode described above, the air in the compartment may be heated by utilizing the heat radiating transfer occurring in second internal heat exchanger 4, and at the same time the air in the compartment may be dehumidified by utilizing the endothermic reaction occurring in first internal heat exchanger 3. The amount of dehumidification and the heating capacity at that time may be controlled by adjusting the output of compressor 1 and the degree of opening of air mixing damper 28, respectively.

When the operation performed is the above heater-heating dry mode, an energy saving step may be achieved by avoiding wasteful consumption of energy by operating the refrigerant circuit with the endothermic amount necessary for dehumidification. The output of compressor 1 is controlled, so that the temperature of air having passed through first internal heat exchanger 3, i.e., the temperature of air before being heated "Te", which is referred to in this embodiment, is set to the aforementioned temperature "m".

After the operation begins in the above mode, the following relationships are monitored (steps ST57 and ST58):

$Te < m$; and dry switch 34:turned OFF.

When the temperature of air before being heated "Te" is less than "m" or dry switch 34 is turned OFF, only the operation of the cooling mode is stopped, and the independent operation of the heater is continued (operation in the heater-heating mode) (steps ST59 and ST60).

As described above, in the air conditioner according to this embodiment, because the heater-heating operation begins when heater switch 35 is turned ON and the outside air temperature "Tam" is less than or equal to the predetermined temperature "k", the heating operation by the heat pump and heater-heating operation may be performed distinctly from each other in accordance with environmental conditions and the like. Thus, comfortable heating may be realized by overcoming the disadvantages caused when a user selects operation modes.

Further, in the heater-heating operation, because the heat of the refrigerant of the heat pump may be also used as a heat source until the brine temperature "Tw" reaches the aforementioned temperature "l", the temperature of the brine may be increased rapidly, whereby air temperature may be quickly raised. Moreover, because heating is carried out by stopping the heat pump and independently operating the heater after the brine temperature "Tw" reaches the predetermined temperature "l", electric power is prevented from being wastefully consumed by the operation of the heat pump, and energy saving operation may be realized.

Further, in the heater-heating operation, because the heater-heating dry operation begins in a condition that the refrigerant circuit side is operated in cooling mode when the temperature of air before being heated "Te" is greater than or equal to the aforementioned temperature "m" and dry switch 34 is turned ON, comfort may be increased by properly performing dehumidification and heating in accordance with environmental conditions and the like. Thus, vehicle windows, such as windshields, do not fog up when heater-heating is performed. Moreover, because endothermic operation on the refrigerant circuit side is controlled based on the temperature of air before being heated "Te", wasteful dehumidifying operations may be prevented, and energy saving operation may be realized.

Further, in the heater-heating dry operation, because the refrigerant circuit is operated by the quantity of endothermic heat necessary for dehumidification to realize energy saving operations by avoiding wasteful consumption of energy, such that the output of compressor 1 is controlled so that the temperature of air passing though first internal heat exchanger 3 "Te" is set to the aforementioned temperature "m", a great advantage may be obtained in electric automobiles which prevent the reduction of a driving range.

Third solenoid valve 10 in the above embodiment is not necessary when the six operation modes as in the above embodiment are performed. Valve 10 is opened or not used in all the operation modes. However, if third solenoid valve 10 is closed in the heating mode, operation in a simple heating mode without dehumidification may be performed by excluding the endothermic reaction in first internal heat exchanger 3. Thus, the refrigerant passing through receiver 14 flows into second expansion valve 7 and external heat exchanger 2 and is evaporated in heat exchanger 2. As a result, heating operation may be performed while saving energy under the conditions which do not require dehumidification.

Further, the solenoid valves may also be flow control valves. In this case, the endothermic reaction and heat radiating transfer in the external heat exchanger, the first internal heat exchanger, and the brine refrigerant heat exchanger may be controlled by the flow control operation, as effected by the respective valves. Further, the check valves may be replaced with shut-off valves or flow control valves, so long as they are capable of controlling a flow direction.

Further, the brine in the embodiment may be a heat medium other than the brine such as, for example, water, ethylene glycol wager solution, air, or the like and the combustion heater for heating it may use any of liquid fuel, gas fuel and solid fuel.

The present invention is not limited to the air conditioner described in the embodiment but applicable to various air conditioners for vehicles so long as they are air conditioners for vehicles capable of at least heating air by the heat of refrigerant in a heat pump and heating air by a heat medium heated by a combustion heater. They may also include air conditioners for vehicles, in which the air conditioner is capable of at least cooling air by the heat of refrigerant in a heat pump and heating air by a heat medium heated by a combustion heater.

It will be appreciated by those skilled in the art that various modifications may be made without materially departing from the novel and advantageous teachings of the invention. Accordingly, the embodiment disclosed herein is by way of example only. It is to be understood that the scope of the invention is not to be limited thereby, but is to be determined by the claims which follow.

What is claimed is:

1. An air conditioner for vehicles including a combustion heater as a heat source for heating and a heat pump for performing a heating operation, comprising:

a heat medium for heat exchange with air to be air-conditioned, which is shared by said heat pump and said combustion heater;

heater-heating operation starting means for starting operations of said heat pump and said combustion heater when a heater switch is turned ON and an outside air temperature is less than or equal to a first predetermined temperature; and heating-condition switching means for stopping the operation of said heat pump and continuing the operation of said combustion heater when the temperature of said heat medium is greater than or equal to a second predetermined temperature after the start of a heater— heating operation, due to the operation of said heat pump and said combustion heater.

2. The air conditioner for vehicles of claim 1 further comprising heater-heating operation stopping means for stopping the operation of said combustion heater when said heater switch is turned OFF or said outside air temperature is greater than said first predetermined temperature during said heater-heating operation.

* * * * *